United States Patent [19]

Crigger

[11] Patent Number: 4,797,022
[45] Date of Patent: Jan. 10, 1989

[54] FASTENER AND FABRICATION METHOD THEREFOR

[75] Inventor: Edward G. Crigger, Rural Retreat, Va.

[73] Assignee: Textron Inc., Providence, R.I.

[21] Appl. No.: 2,304

[22] Filed: Jan. 9, 1987

[51] Int. Cl.$^4$ .......................................... F16B 39/282
[52] U.S. Cl. ............................... 403/408.1; 403/405.1; 411/188; 411/187; 411/959
[58] Field of Search ............... 411/187, 188, 189, 338, 411/339, 353, 368, 386, 387, 393, 399, 546, 999, 161, 185, 959; 174/138 D; 403/408.1, 405.1

[56] References Cited

U.S. PATENT DOCUMENTS

| | | | |
|---|---|---|---|
| 1,968,516 | 7/1934 | Dieter | 411/399 |
| 2,136,523 | 11/1938 | Rosenberg | 411/371 |
| 2,147,209 | 2/1939 | Olson | 411/187 |
| 2,833,326 | 5/1958 | Knohl | 411/959 X |
| 2,871,752 | 2/1959 | Stern . | |
| 3,118,718 | 1/1964 | Babey | 411/353 X |
| 3,120,254 | 2/1964 | Waltermire et al. . | |
| 3,389,734 | 6/1968 | Gutshall | 411/185 |
| 3,399,705 | 9/1968 | Breed et al. . | |
| 3,418,869 | 12/1968 | Herpich | 411/546 X |
| 3,456,972 | 7/1969 | Drotar | 411/166 X |
| 3,967,669 | 7/1976 | Egner . | |
| 4,220,188 | 9/1980 | McMurray | 411/188 |

FOREIGN PATENT DOCUMENTS

| | | | |
|---|---|---|---|
| 247297 | 9/1963 | Australia | 411/387 |
| 399985 | 10/1933 | United Kingdom | 411/168 |
| 8606449 | 10/1986 | World Int. Prop. O. | 411/399 |

Primary Examiner—Lloyd A. Gall
Assistant Examiner—Curtis B. Brueske
Attorney, Agent, or Firm—Trexler, Bushnell, Giangiorgi & Blackstone, Ltd.

[57] ABSTRACT

An improved fastener provides axially extending teeth on a narrow shoulder adjacent the fastener head. The teeth bite into sheet material, and are particularly useful in biting into the surface of a thin sheet which is fastened to a thicker sheet material. The teeth extend from a shoulder formed on a medial collar between the head and a threaded shank. The narrow shoulder has a larger diameter than the end of the threaded shank to which the shoulder is joined. The teeth can be formed by coldflow of the material of the shoulder so that the teeth axially extend from the outer peripheral edge of the shoulder in order to bite into the thin sheet metal proximate the annular periphery of the aperture in which the threaded shank is engaged. Preferably, the teeth axially overlap the threading of the shank which extends entirely to its junction with the shoulder, and the teeth are fabricated after the shank thread in order to enable such overlap by the teeth.

11 Claims, 1 Drawing Sheet

FIG. 3

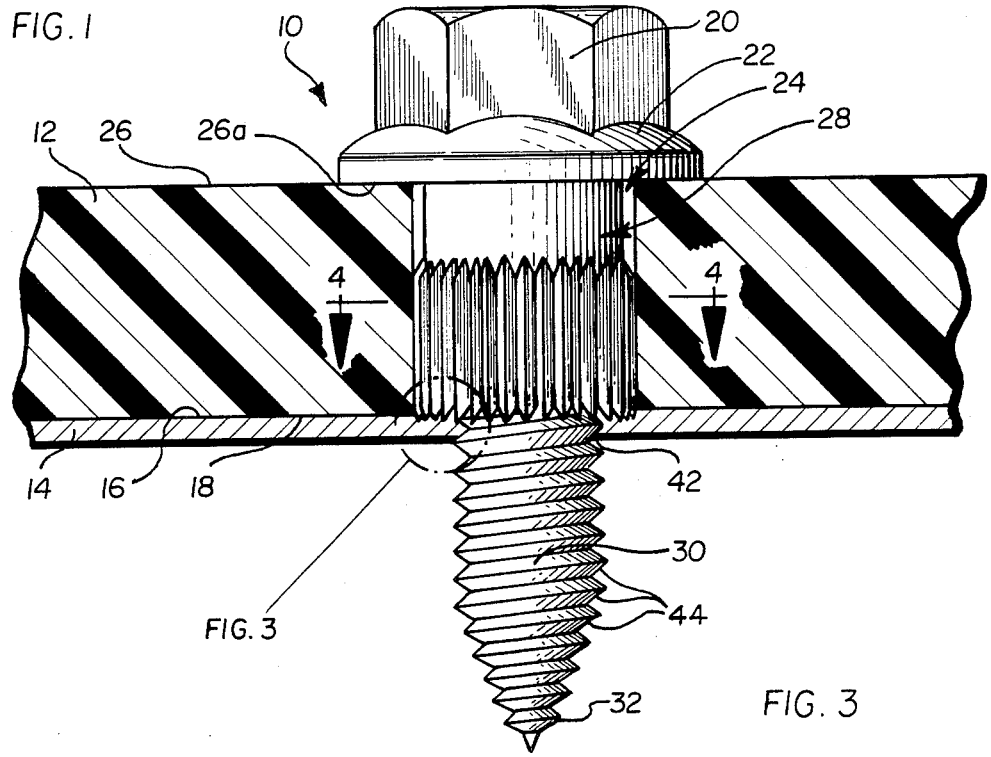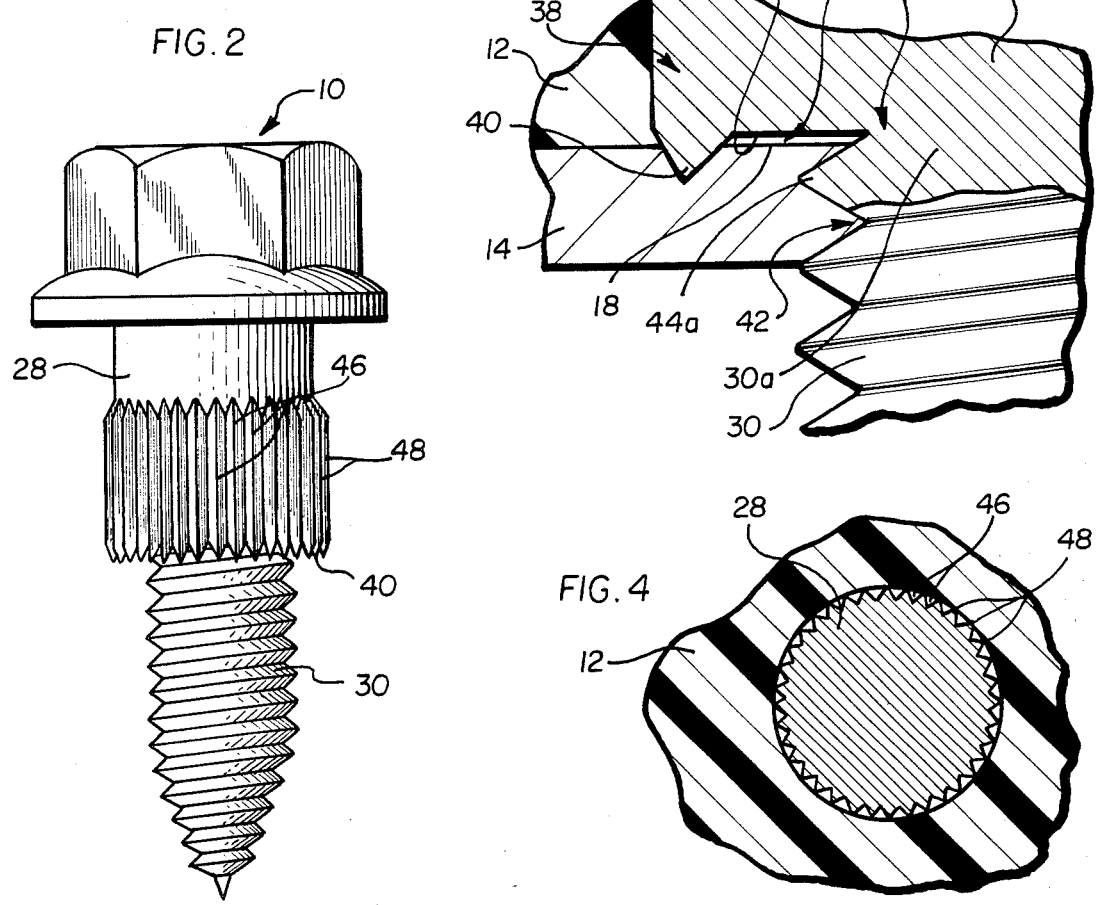

FASTENER AND FABRICATION METHOD THEREFOR

BACKGROUND OF THE INVENTION

This invention relates to fasteners for joining sheet materials, and further relates to improved fasteners which provide particularly improved installation and locking action in joining a relatively thick member such as a plastic component to a thinner underlying support structure of sheet metal.

In the assembly or erection of structures in which a relatively thick sheet material such as plastic, rigid insulation, or other similar materials, is joined to a relatively thin sheet material, for example typical thin sheet metal, the fastener conventionally employed has been a typical sheet metal screw in which the length of the threaded shank has been matched to accommodate the thickness of the thicker sheet material In this conventional joint, preformed holes through each of the sheet materials are aligned and the shank of the sheet metal screw is inserted first through the thicker material and then driven through the sheet metal. The two sheets are thus clamped between the fastener threads engaged in the sheet metal and the typical flanged driving head engaged against the exposed surface of the thicker sheet.

Because the flanged head is spaced from the thinner sheet metal by the thickness of the thicker sheet, there is little reinforcement of the thinner sheet metal at the periphery of the aperture in which typically only one or at most two pitches of threading are engaged. As a consequence of the small number of thread turns in engagement with the underlying sheet metal component, there is a danger that the joint will be stripped if the fastener is over-torqued. Also, since the last thread turn adjacent the collar or shoulder is often incompletely formed, it cannot be relied upon to effect engagement with the sheet material, as the fastener will merely spin and attain no clamping action. As such, while sufficient torque must be applied to attain the desired clamping engagement, it must not be excessive, as stripping of the joint can occur.

To overcome the problem of stripping and spinning, it has been proposed to place teeth on the flanged driving head. These teeth will engage the sheet material and increase the driving torque, while preventing the application of excessive torque to the threaded connection between the fastener and the sheet metal component. Also, serrated washers may be employed. A preferred approach is to have teeth on a shoulder immediately adjacent the thread for engaging the sheet metal material. These teeth would control the application of torque and also assume that only threads or thread turns which are fully formed engage the sheet metal component.

Prior to the present invention, however, the provision of teeth on a narrow shoulder has been a difficult and expensive procedure, and not cost justified or cost effective.

These deficiencies are eliminated by the improved fastener and method of manufacture of the present invention, as well as the improved joint attained therewith.

The improved fastener of the invention provides axially extending teeth on a narrow shoulder adjacent the fastener thread which bite into the metal sheet material and are particularly useful in biting into the surface of a thin sheet which is fastened to a thicker sheet material The teeth extend from a medial collar of the fastener at a shoulder formed on the collar which has a larger diameter than the end of the threaded shank to which the shoulder is joined. The head of the fastener is formed on the opposite end of the medial collar. Most importantly, the teeth are provided by a simple and standard process known as knurling, which is performed readily and without considerable expense.

In the preferred embodiment, the threading of the shank is performed prior to the knurling operation and the thread extends entirely to its junction with the shoulder. As a result of the knurling of the collar subsequent to threading of the shank, the cold working of the collar material will produce protuberances or teeth which extend axially from the collar and are disposed in spaced, overlapping relation to at least the first thread turn on the fastener shank The teeth are formed by cold-flow of the material of the shoulder so that the teeth extend from the outer peripheral edge of the shoulder in order to bite into the thin sheet metal proximate the annular periphery of the aperture in which the threaded shank is engaged in the secured joining of the two sheet materials. The overlap of the teeth with respect to the first thread turn insures that sufficient engagement of the teeth with the sheet metal will occur before the shoulder abuts the sheet metal component.

BRIEF DESCRIPTION OF THE DRAWING

FIG. 1 is a partial sectional view of a joint assembly of the invention, illustrating a composite of a thick sheet material and a thin sheet material, typically sheet metal, which are secured together by the novel fastener of the invention;

FIG. 2 is a plan view of the fastener in FIG. 1;

FIG. 3 is a view, partially in section, of the portion of the joint in FIG. 3, broken away to illustrate one of the teeth axially extending from a medial portion of the fastener and biting into the surface of the thin sheet (engaging the second sheet) adjacent to the aperture through the thin sheet in which the threaded shank of the fastener is securely engaged; and FIG. 4 is a sectional view taken along line 4—4 of FIG. 1 and viewed in the indicated direction.

DETAILED DESCRIPTION OF THE ILLUSTRATED EMBODIMENT

The following description of the embodiment in the drawings is an example of the invention, but does not indicate limitation upon the scope of the appended claims.

Referring to FIG. 1, the fastener designated generally by a reference character 10 secures the composite engagement of a relatively thicker sheet material 12, such as plastic, insulation or similar material, and a thinner sheet, typically sheet metal, 14 along respective planar surfaces 16 and 18. The fastener 10 includes a driving head 20 with conventional hexagonal tool engaging surfaces and an integral flange 22. The sheet 12 includes a preformed, through passageway or aperture 24 which opens through both the exposed surface 26 and the opposing engaged surface 16 of the sheet 12. The flange 22 covers the opening of the passageway through the surface 26 and engages a corresponding annular portion thereof 26a surrounding the opening of the passageway 24.

Referring to both FIGS. 1 and 2, a medial, generally cylindrical collar portion 28 of the fastener 10 is formed between the flanged head 20, 22 and the threaded shank 30 which can have a tapered point 32. As illustrated in FIG. 1, the collar 28 is positioned within the passageway 24 in the fully secured joint assembly illustrated, and therefore the length of collar 28 is generally governed by the thickness of the thicker sheet 12.

As shown in FIG. 1 and best illustrated in FIG. 3, the collar 28 has a larger diameter than that of the joining end 30a of the shank 30 at the integral junction 34; consequently, an axially exposed annular face 36 surrounds the junction 34. The annular face 36 extends radially outwardly to define the lower surface of a shoulder 38 formed at the end of the collar 28 adjacent the shank end 30a. A series of axially projecting teeth 40 extend from the radially outer peripheral edge of the annular face 36 at the circumference of the shoulder 38. The teeth 40 bite into the engaged surface 18 of the sheet 14 when the shank 30 is driven through a preformed aperture 42 through the sheet 14 which is coaxially aligned with the passageway 24 through the sheet 12.

Referring again to FIG. 3, because the thread 44 extends entirely to the junction 34 of the shank end 30a and the collar 28, the axial extention of the teeth 40 overlaps the last thread turn 44a, and the overlap is preferably a distance equal to approximately one-quarter to one-half of the pitch of the thread turn 44a.

This overlap enables important benefits when the fastener is installed to secure the composite. After aligning the passageway 24 with the aperture 42, the shank 30 is passed entirely through the passageway 24, and then the threaded shank 30 is driven through the aperture 42 so that the collar 28 is inserted into the passageway 24. Because of the overlapping entension of the teeth 40, they will bite into the sheet metal surface 18 before the last thread turn 44a has entirely entered the aperture 42. As a result of the initial biting by the teeth 40, there is temporary clearance space A between the face 36 and the surface 18. The seating torque transmitted to the thread 44 and aperture 42 is reduced by the biting resistance, ensuring that the reduced torque cannot strip any threading from the aperture 42 when the end of the last thread turn 44a has fully entered the aperture 42 and the clearance space A is substantially or entirely eliminated in the completed joint. While the torque applied to the threaded connection is controlled, the engagement of the teeth 40 with the sheet metal surface 18 has the effect of increasing and maintaining the clamping force applied by the driving head 20.

In addition to reducing the seating torque transmitted to the engaged thread turns 44a, the biting by the teeth 40 increases the tension and rigidity of the sheet 14 at the periphery of the aperture 42, further promoting both the tight engagement of the threading and increased engaging pressure of the flange 22 against the surface 26a of the sheet 12. In typical installations, the applied torque required to strip the fastener 10 has been increased more than 150% of the torque which strips a conventional sheet metal screw, for example 80 in. lbs. compared to 30 in. lbs. In addition, the fastener creates improved holding power and resistance to vibration loosening. Depending upon the length of the collar 28 relative to the thickness of the sheet 12, the annular face 36 can provide a stop surface against the sheet 14 in addition to the stop provided by the engagement of the flange 22 against the sheet 12.

In a preferred method for fabricating the fastener 10, and particularly the teeth 40, from a blank having a smooth collar and shank and appropriate relative diameters thereof, first the shank is threaded so that the last thread turn 44a extends to the annular face 36; thereafter, the collar 28 can be cold worked or formed by knurling tool or similar impression tooling to produce a series of axially aligned indentations 46 separated by outwardly projecting ridges or knurls 48, as illustrated in FIGS. 3 and 4. The knurling as shown in the drawings is straight or axially aligned, it is envisioned however, that knurling of a helical disposition may be employed to achieve the same result. The knurling can, but need not, extend to the full upper regions of the collar 28. During the deformation the collar material is caused to cold-flow axially downwardly from the shoulder 38 to form the teeth 40 extending therefrom. In this manner of fabrication, the teeth 40 can be axially extended to overlap at least the last thread turn 44a of the thread which has been previously fabricated on shank 30.

In light of the foregoing description of the embodied fastener, joint, and fabrication method, modifications will be evident to those skilled in the art and are within the broad scope of the appended claims.

The invention is claimed as follows:

1. A joint structure comprising in combination: a composite of at least two sheets of material having respective generally planar surfaces in secured engagement, said sheet materials comprising; a first, generally thinner sheet metal or the like, and a second, relatively thicker sheet material; and a fastener securing the composite, said fastener comprising; a threaded shank securely engaged within an aperture formed in said first sheet; a head engaging an exposed surface of said second sheet opposing the engaged surfaces of said first and second sheets; a medial collar formed between said head and said shank, and positioned within a passageway through said second sheet, said collar comprising; a generally cylindrical radially exterior surface; a shoulder formed at an end of the collar joining an end of said shank, said shoulder having an axially exposed, annular face extending radially beyond the joining end of said shank, and a series of teeth extending axially from said annular face and biting into the engaged surface of said first sheet, for increasing the strength of the engagement of the aperture by said shank.

2. The joint structure of claim 1, wherein said axial extension of the teeth overlaps threading at said shank end.

3. The joint structure of claim 2 wherein said threading extends to said annular face of the shoulder.

4. The joint structure of claim 2 wherein said teeth axially extend for a distance equal to approximately one-quarter to one-half the pitch of the last thread adjacent said shank end.

5. The joint structure of claim 2 wherein said teeth are axially aligned between corresponding indentations formed in said cylindrical surface of said collar.

6. The joint structure of claim 1 wherein said teeth extend from the radially outer peripheral edge of said annular face.

7. A fastener for connecting two sections of sheet material having respective, apertured generally planar surfaces, including a first, generally thinner section of sheet metal or the like and a second, relatively thicker section of sheet material, such that the first and second sections are clamped by the fastener inserted through the respective aligned apertures, said fastener comprising: a driving head having a flange at one end for clamping against the exposed surface of said second sheet section; and a shank passing through said aligned apertures and including: a threaded shank portion for engagement within the aperture of the first, sheet metal section, and a medial shank portion forming a collar having a larger diameter than said threaded shank portion and defining a shoulder at a junction therewith, said collar being disposed between the threaded shank portion and said flange for engagement within said second section, said medial shank collar having a series of axially extending teeth formed on the outer peripheral surface of said collar, said teeth axially extending beyond said shoulder portion so that said teeth axially overlap the threading of the threaded portion in order to bite into the peripheral surface of the aperture in said first, sheet metal section and to increase the retention of said clamping.

8. The fastener of claim 7 wherein said threading extends to said shoulder.

9. The fastener of claim 8 wherein said teeth axially extend approximately one-quarter to one-half the pitch of the last thread turn adjacent said shoulder.

10. The fastener according to claim 7 wherein said collar has a series of axially extending protuberances formed on the outer peripheral surface thereof such that said teeth axially extend from said respective protuberances.

11. A fastener for joining sections of sheet material, said fastener comprising: a threaded shank; a driving head having a flange for clamping said sections; a medial collar formed between said head and shank, said collar comprising a generally cylindrical outer surface; a shoulder formed at an end of the collar adjacent the threaded shank end of a larger diameter than the major diameter of the thread on the shank; a series of axially extending indentations formed in said outer surface, the formation of which causes material of said collar to flow axially to project beyond the shoulder of said collar proximate the cylindrical outer surface thereto to define a series of teeth which overlap at least partially the last thread on said shank and are disposed for biting engagement with a sheet member with which said thread shank is engaged.

* * * * *